United States Patent [19]

Liao et al.

[11] Patent Number: 5,387,318
[45] Date of Patent: * Feb. 7, 1995

[54] WATER SOLUBLE GRAFT COPOLYMERS FOR LASER PRINT DEINKING LOOP CLARIFICATION

[75] Inventors: Wen P. Liao, Warminster, Pa.; John C. Harrington, Jacksonville, Fla.; Walter J. Burgess, Phoenixville; Fu Chen, Newtown, both of Pa.

[73] Assignee: Betz Laboratories, Inc., Trevose, Pa.

[*] Notice: The portion of the term of this patent subsequent to May 18, 2010 has been disclaimed.

[21] Appl. No.: 169,819

[22] Filed: Dec. 17, 1993

Related U.S. Application Data

[60] Continuation-in-part of Ser. No. 773, Jan. 5, 1993, Pat. No. 5,298,566, which is a division of Ser. No. 691,206, Apr. 25, 1991, Pat. No. 5,211,854.

[51] Int. Cl.$^6$ ................................. C02F 1/56
[52] U.S. Cl. ............................. 162/5; 162/72; 162/189; 162/190; 210/734
[58] Field of Search ............... 210/734; 525/296; 162/5, 72, 189, 190

[56] References Cited

U.S. PATENT DOCUMENTS

| | | | |
|---|---|---|---|
| 5,013,456 | 5/1991 | St. John | 210/734 |
| 5,211,854 | 5/1993 | Liao et al. | 210/734 |
| 5,266,166 | 11/1993 | Dreisbach | 162/199 |
| 5,269,942 | 12/1993 | Harrington | 210/727 |

OTHER PUBLICATIONS

Pulp & Paper Chemistry & Chemical Technology, 3d ed., vol. III, 1981, pp. 1593–1607.

Betz Handbook of Industrial Water Conditioning, 9th ed., 1991, pp. 22–30.

*Primary Examiner*—Vasu S. Jagannathan
*Attorney, Agent, or Firm*—Alexander D. Ricci; Philip H. Von Neida; Gregory M. Hill

[57] ABSTRACT

A method for clarifying the laser print deinking loop water in a papermaking process by using a water soluble graft copolymer having the structure:

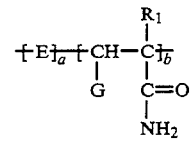

wherein E is the repeat unit obtained after polymerization of an $\alpha,\beta$ ethylenically unsaturated compound, the molar percentage of a:b is from about 95:5 to 5:95, with the proviso that the sum of a and b equals 100%; G comprises the structure:

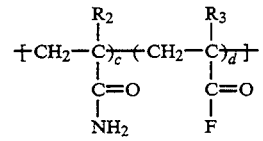

wherein d is a cationic monomer, $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

13 Claims, 2 Drawing Sheets

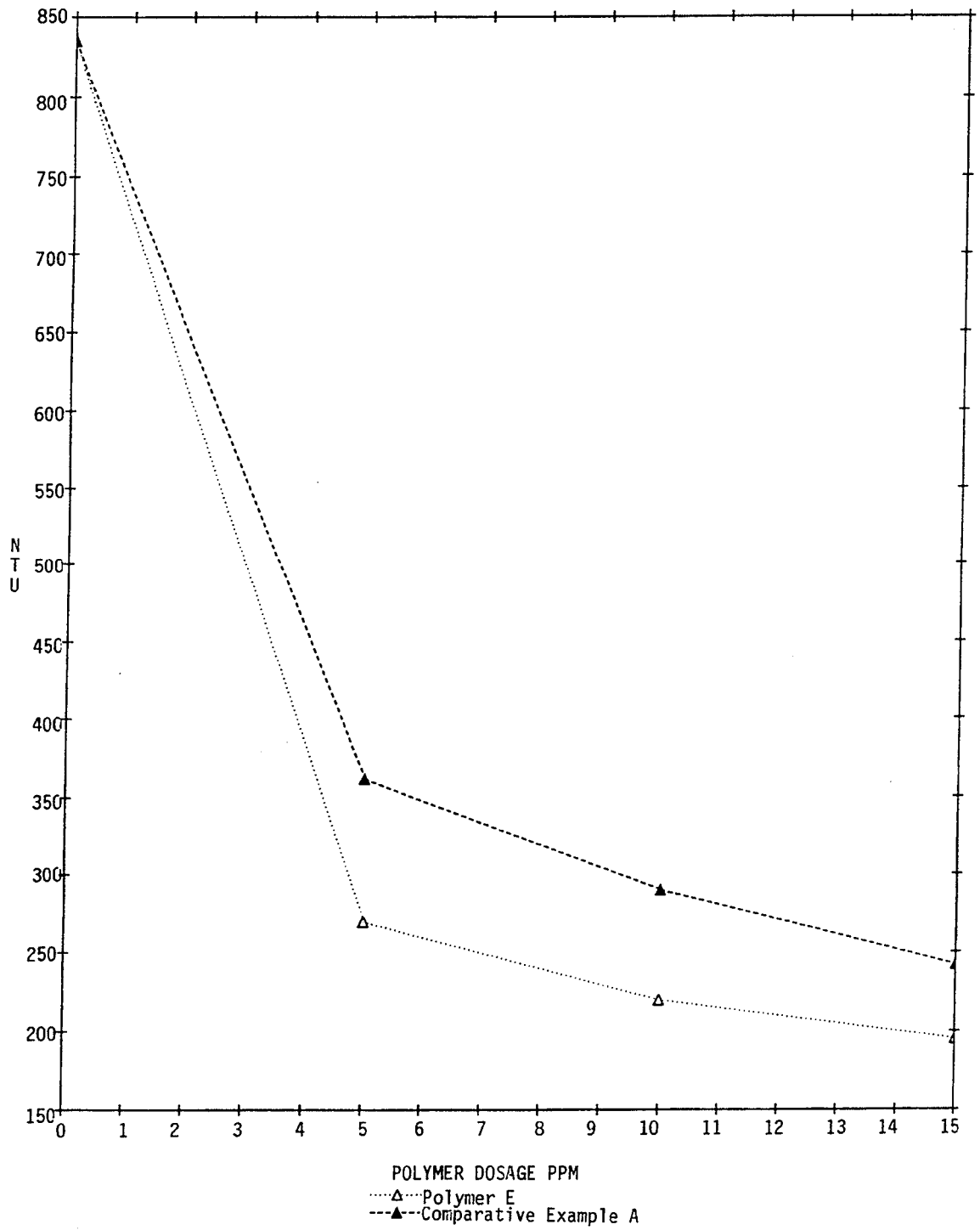

WATER SOLUBLE GRAFT COPOLYMERS FOR LASER PRINT DEINKING LOOP CLARIFICATION

This is a continuation-in-part of application Ser. No. 08/000,773 filed Jan. 5, 1993 now U.S. Pat. No. 5,298,566, which is a divisional of application Ser. No. 07/691,206 filed Apr. 25, 1991 now U.S. Pat. No. 5,211,854.

FIELD OF THE INVENTION

The present invention pertains to novel water soluble graft copolymers which are useful for water treatment, such as sludge dewatering and water clarification. More particularly, it relates to the use of a novel graft copolymer for the clarification of water in the deinking loop of a paper making process using recycled laser print paper.

BACKGROUND OF THE INVENTION

There is an increasing usage of water soluble polymers and copolymers in wastewater treatment industries. These compounds have shown desirable utility For the purpose of dewatering sludge and clarifying contaminated water.

The efficacies of the polymers or copolymers used will vary depending upon the type of monomers chosen to form the polymer or copolymer, the molecular weight of the synthesized molecule and, in the case of a copolymer, the placement of the selected monomers on the backbone of the copolymer. It is the latter characteristic that is the focus of the present invention.

Polymers with long sequences of two monomers can be categorized as block copolymers or graft copolymers. In graft copolymers sequences of one monomer are "grafted" onto a "backbone" of the second monomer type,

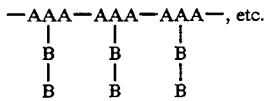

Graft copolymers have unique and highly desirable proper ties as compared to random copolymers or the blend of two homopolymers. Therefore, there is a great interest in preparing them. Few techniques described in the literature satisfy the need.

Furthermore, with ever increasing usages of water soluble polymers and copolymers in industries such as wastewater treatment, cooling, boiler and deposit control, coating, textile, mining, detergency, cosmetics, and papermaking, etc., there is an urgent need to synthesize novel water soluble graft copolymers for this broad range of applications.

More specifically, the use of recycled fibers is becoming an important aspect of papermaking for economic and environmental considerations The preliminary manufacturing steps in the use of recycled fibers for papermaking consists of repulping the paper sources, then removing the printing inks from the fibers. A typical deinking process utilizes a combination of chemical and mechanical techniques in several stages. Large amounts of water are used in the washing or flotation stages, wherein chemically treated ink particles and other contaminants are physically removed from the fibrous slurry. The wastewater, or effluent, from these stages is typically recycled back into the mill for reuse in the deinking process. As the recycled effluent contains dispersed inks, fiber fines and inorganic fillers, these contaminants must be removed to provide a clean water source for the deinking process and to prevent the dispersed inks from being reintroduced into the fibers. The effluent may also be discharged from the mill; thus, suspended solids must be removed from the wastewater to meet environmental regulations.

Clarification chemicals are typically utilized in con junction with mechanical clarifiers for the removal of solids from the effluent. Clarification generally refers to the removal of material by coagulation, and/or flocculation, then sedimentation or flotation. See the Betz Handbook of Industrial Water Conditioning 9th Edition, 1991, Betz Laboratories, Inc., Trevose, Pa. pages 23 through 30.

Conventional polyacrylamide copolymers have been used in this application. However, there still exists a need to provide a novel polymer in a more effective and economic treatment process. This objective is achieved by the present invention. The novel graft copolymers exhibit the desired efficacy for laser deink clarification applications.

BRIEF DESCRIPTION OF THE DRAWING

FIGS. 1 and 2 are graphs demonstrating water clarification (supernatant NTU) versus polymer dosage for the inventive graft copolymers and comparative linear polymers.

DETAILED DESCRIPTION OF THE INVENTION

Figure 1:
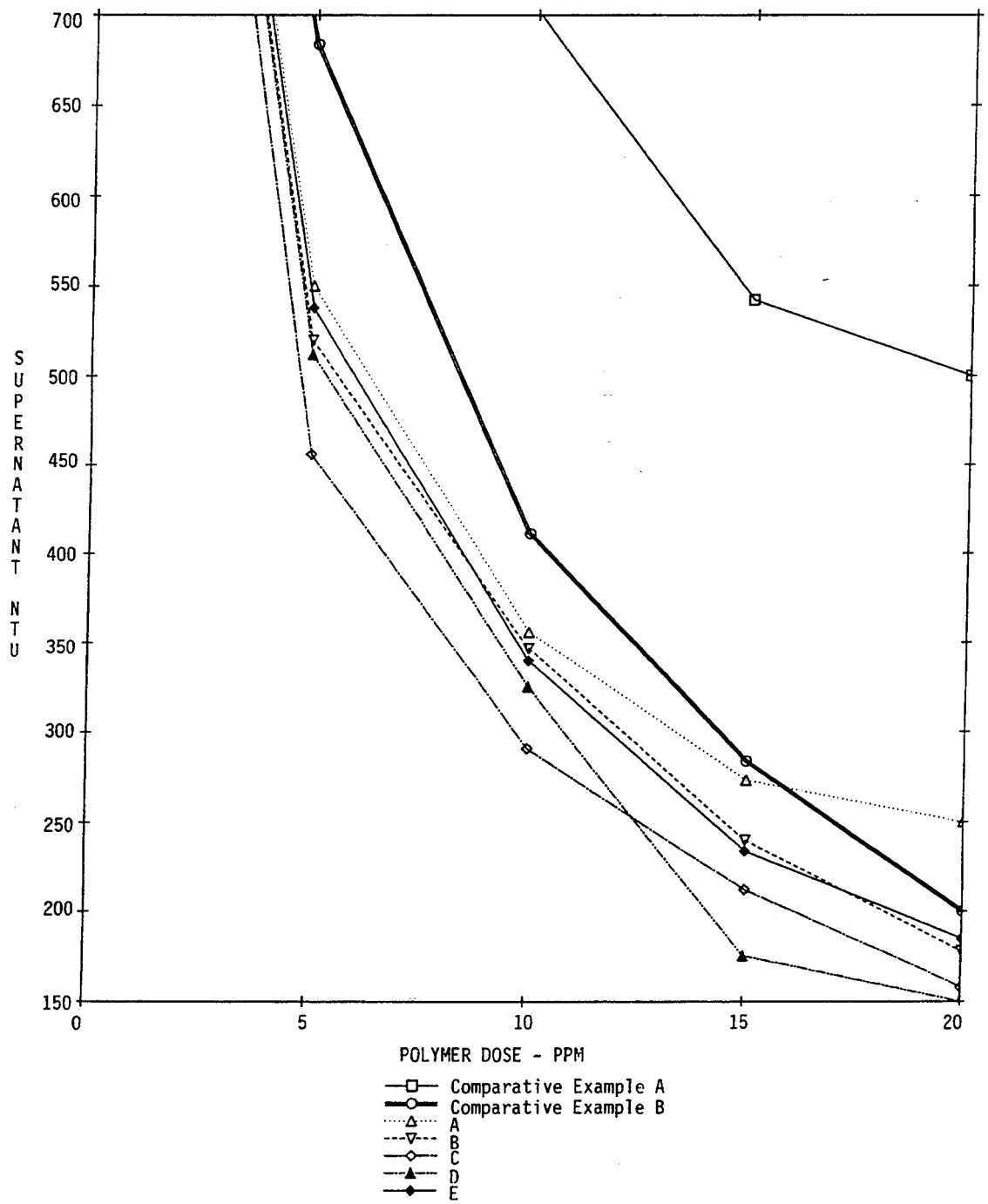

The present invention pertains to the use of novel water soluble graft copolymers as laser print deinking loop clarifiers.

Specifically, the graft polymers in the invention contain polymeric segments obtained from the polymerization of acrylamide and cationic monomers which are attached or "grafted" to another polymer chain which is comprised of the repeating units of one or more monomers. The resulting graft copolymers are soluble in an aqueous medium.

The graft copolymer of the invention has the general structure:

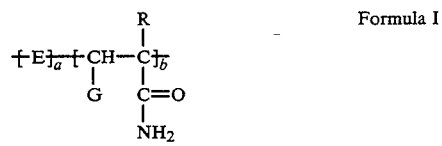

Formula I wherein E in the above formula (Formula I) is the repeat unit obtained after polymerization of an $\alpha,\beta$ ethylenically unsaturated compound, preferably carboxylic acid, amide form thereof, alkyl (C1–C8) ester or hydroxylated alkyl (C1–C8) ester of such carboxylic acid. Compounds encompassed by E include the repeat unit obtained after polymerization of acrylamide, methacrylamide, acrylic acid, methacrylic acid, maleic acid or anhydride, styrene sulfonic acid, 2-acrylamido-2-methylpropyl sulfonic acid, itaconic acid, and the like. Ester derivatives of the above mentioned acids such as 2-hydroxypropyl acrylate, methyl methacrylate, and 2-ethylhexyl acrylate, are also within the purview of the invention.

The molar percentage of a:b is from about 95:5 to 5:95, with the proviso that the sum of a and b equals 100%.

G in the above formula (Formula I) is a polymeric segment comprising repeat units having the structure:

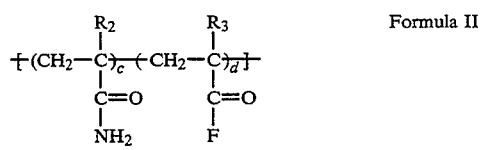
Formula II wherein $R_1$, $R_2$ and $R_3$ in Formulae I and II are the same or different and are hydrogen or a lower alkyl group having $C_1$ to $C_3$. F in the above formula is a salt of an ammonium cation, such as $NHR_3N^+R_{(4,5,6)}$ $M^-$ or $OR_3N^+R_{(4,5,6)}$ $M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and M is an anion, such as chloride, bromide, or methyl or hydrogen sulfate. Typical cationic monomers are 2-acryloyloxyethyltrimethylammonium chloride (AETAC), 3-(meth)acrylamidopropyltrimethylamrnonium chloride (MAPTAC or APTAC), 2-methacryloyloxyethyltrimethylammonium chloride (METAC) and diallyldimethylammonium chloride (DADMAC), etc.

It is understood that more than one kind of cationic monomer may be present in Formula II.

The molar percentage c:d in Formula II may vary from 95:5 to 5:95, with the proviso, however, the sum of c and d equals 100%.

There is no limit to the kind and mole percent of the monomers chosen so long as the total adds up to 100 mole % and the resulting copolymers are water soluble.

At present, the preferred water soluble graft copolymer for use as a laser print deinking loop clarifier is:

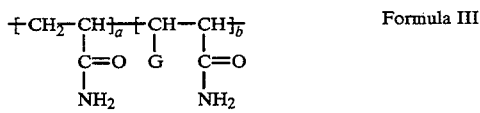
Formula III

The molar percentage of a:b is from about 95:5 to 5:95, with the proviso that the sum of a and b equals 100%. G in Formula III is:

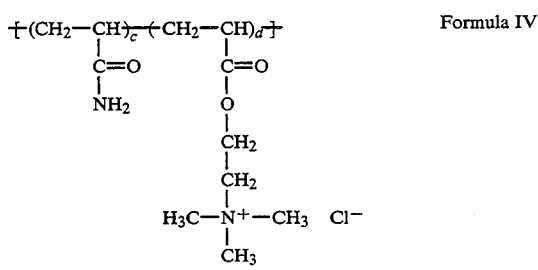
Formula IV

The cationic monomer is 2-acryloyloxyethyltrimethylammonium chloride (AETAC). The molar percentage c:d in the polymer segment G (Formula IV) is the ratio of Acrylamide:AETAC. It may fall within the range between 95:5 and 5:95. The sum of c and d must add up to 100%.

The number average molecular weight ($M_n$) of the polymeric segment G is not critical and may fall within the range of 1,000 to 1,000,000. Preferably, the number average molecular weight will be within the range of 5,000 to 500,000, with the range of about 10,000 to about 200,000 being even more desirable. The key criterion is that the resulting graft copolymer be water soluble.

The graft copolymer is prepared via a two-step polymerization process. First, a macromonomer comprised of acrylamide and AETAC is prepared by a water-in-oil inverse emulsion polymerization method using peroxide as an initiator. Such processes have been disclosed in U.S. Pat. Nos. 3,284,393, Re. 28,474 and Re. 28,576, herein incorporated by reference. The initiator may be selected from peroxides, persulfates, bromates, and azo-type initiators such as 2,2'azobis-(2-amidinopropane) dihydrochloride, 2,2'-azobis-(2,4-dimethylvaleronitrile). Copper (II) sulfate is added in the process as an oxidative chain transfer agent to generate a terminal unsaturated double bond in the polymer chain. It is conceivable that transition metal ions other than copper, such as iron, cobalt, and nickel etc., may be used in the invention.

Ethylenediaminetetraacetic acid or diethylenetriamine pentaacetic acid and their salts or their amino analogue are used as chelating agents to chelate or to form complexes with copper prior to the second polymerization step.

The resulting macromonomer is then copolymerized with acrylamide or other monomers to form graft copolymers by a similar water-in-oil inverse emulsion technique.

Branching agents such as polyethyleneglycol di(meth)acrylate, N,N'-methylenebis(meth)acrylamide, N-vinyl acrylamide, allyl glycidyl ether, glycidyl acrylate and the like may also be added, providing the resulting graft copolymer is water soluble. Any of the well known chain transfer agents familiar to those who skilled in the art may be used to control the molecular weight. Those include, but are not limited to, lower alkyl alcohols such as isopropanol, amines, mercaptans, phosphites, thioacids, formate, allyl alcohol and the like.

Conventional initiators such as peroxide, persulfate, along with sulfite/bisulfite and azo compounds may be used depend on the system chosen.

High HLB inverting surfactants such as those described in U.S. Pat. No. Re. 28,474 are then added to the emulsion to convert the resulting emulsion to a "self-inverting" emulsion. Using the procedure described herein, a unique graft copolymer in emulsion form is obtained.

The resulting copolymer may also be further isolated by precipitating it in an organic solvent such as acetone and dried to a powder form. The powder can be easily dissolved in an aqueous medium for use in the desired applications.

It is to be understood that the aforementioned polymerization methods do not in any way limit the synthesis of copolymers according to this invention.

The resulting emulsion disperses and dissolves rapidly into an aqueous solution upon addition to water. Within minutes, a maximum solution viscosity is obtained. The emulsion dissolves well even in water containing a high level of hardness and it also retains most of its solution viscosity in brine water.

The structure of the graft copolymer is substantiated by a conventional solution viscosity study and $C^{13}$ NMR spectroscopy. The molecular weight of the resulting graft copolymer is not critical, as long as the polymer is soluble in water. The molecular weight may vary over a wide range, e.g., 10,000–30,000,000 and may be selected depending upon the desired application.

The graft copolymer is added to the influent flow prior to the clarifier. It is added in an amount of from about 0.5 to 100 ppm of polymer per total influent volume. Preferably 2 to 25 ppm of polymer per total influent volume is used.

Experimental

Properties of five water soluble graft copolymers prepared according to the procedure described above are shown in Table I. The copolymers contain an overall amount of 20 mole % AETAC and 80 mole % acrylamide.

TABLE I

Physical Properties of the Graft Copolymers

| Polymer | Solids % | UL* Viscosity (cps) |
|---|---|---|
| A | 39.6 | 9.0 |
| B | 35.8 | 11.4 |
| c | 38.5 | 12.2 |
| D | 41.4 | 18.1 |
| E | 33.2 | 25.1 |

*UL viscosity: 0.3% solids of polymer dissolved in 4% NaCl solution, as measured with an UL adapter in a Brookfield Viscometer.

*UL viscosity: 0.3% solids of polymer dissolved in 4% NaCl solution, as measured with an UL adapter in a Brookfield Viscometer.

Performance Test

EXAMPLE 1

In the following test, the performance of the water soluble graft copolymers described in this invention is demonstrated. The test substrate is a deinking process water containing 100% recycled laser print fiber from a Midwest paper mill. The substrate had the following properties: pH, 7.0–7.5, solids, 0.126% and a total turbidity of 1300–1400 NTU

TEST PROCEDURE—DEINK LOOP CLARIFICATION 1. 250 milliliters (ml) of stock at 25 C is measured in a graduated cylinder and poured into a 400 ml glass beaker. The beaker contains a Teflon coated magnetic stirring bar, and is centered on a magnetic stirring plate. The stir plates have been previously calibrated to provide approximately equivalent shear mixing speeds at "high" and "low" speeds.

2. The beakers are turned on to high speed; once the samples have equilibrated, the test level of coagulant is introduced into the center of the vortex with a previously filled syringe. The polymer is allowed to mix for a predetermined time consistent with the individual mill's clarifier design, typically 10 to 60 seconds.

3. After the polymer mix time, the speed of the mixer is reduced to "low" speed for a time period consistent with the actual clarifier, typically 30 to 60 seconds. After the low speed mixing time is completed, the mixers are turned off, and the flocculated particles are allowed to settle. The settling volumes and times are recorded.

4. Supernatant is then removed from the beaker, and the turbidity is recorded on a turbidimeter for each polymer and polymer dosage level.

The results are shown in Table II and FIG. 1. Comparative polymers A and B are commercially available linear copolymers containing 20 mole % and 40 mole % of AETAC, respectively (the remainder, acrylamide). The above data demonstrate that the graft copolymers in this invention are more effective in water clarification than the comparative linear polymers.

TABLE II

Clarification Test

| Polymer | Dosage (ppm) | Supernatant (NTU) |
|---|---|---|
| A | 5 | 550 |
|  | 10 | 356 |
|  | 15 | 273 |
|  | 20 | 250 |
| B | 5 | 520 |
|  | 10 | 347 |
|  | 15 | 240 |
|  | 20 | 178 |
| C | 5 | 456 |
|  | 10 | 291 |
|  | 15 | 212 |
|  | 20 | 158 |
| D | 5 | 512 |
|  | 10 | 325 |
|  | 15 | 175 |
|  | 20 | 150 |
| E | 5 | 538 |
|  | 10 | 340 |
|  | 15 | 234 |
|  | 20 | 185 |
| Comparative Polymer A | 5 | 860 |
|  | 10 | 702 |
|  | 15 | 542 |
|  | 20 | 500 |
| Comparative Polymer B | 5 | 684 |
|  | 10 | 411 |
|  | 15 | 284 |
|  | 20 | 200 |

EXAMPLE 2

Where the previous example tested deinking process water that contained 100% recycled laser print, many paper mills will only utilize a portion of laser print in the total fiber composition. In the following example, process water from a Northwest paper mill was tested. It contained approximately 20% to 40 recycled laser print fiber with the remainder being made up of nonimpact print fiber. The substrate exhibited a pH of 6.6 and had a solids content of 0.052%. The same test protocol as in Example 1 was followed and the polymers used are as defined previously. Results are shown in Table III and FIG. 2.

TABLE III

Clarification Test

| Polymer | Dosage (ppm) | Supernatant (NTU) |
|---|---|---|
| Blank | 0 | 835 |
| E | 5 | 270 |
|  | 10 | 220 |
|  | 15 | 195 |
| Comparative Example A | 5 | 362 |
|  | 10 | 290 |
|  | 15 | 242 |

The foregoing tests demonstrate that the graft configuration of the subject polymer is more efficient at clarifying process water containing laser pring fiber than is the linear configuration of the same molecule.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of clarifying laser print deinking loop water of a papermaking process comprising adding to the clarifier influent from about 0.5 ppm to about 500 ppm of a water soluble graft copolymer having the structure:

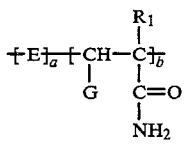

wherein E is the repeat unit obtained after polymerization of an $\alpha,\beta$ ethylenically unsaturated compound, the molar percentage of a:b is from about 95:5 to 5:95, with the proviso that the sum of a and b equals 100%; G comprises the structure:

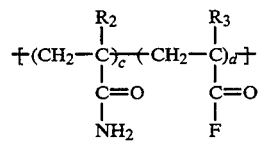

wherein d is a cationic monomer, $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

2. The method of claim 1 wherein the $\alpha,\beta$ ethylenically unsaturated compound is selected from the group consisting of an unsaturated carboxylic acid, the amide form thereof, the alkyl ($C_1$-$C_8$) ester thereof and the hydroxylated alkyl ($C_1$-$C_8$) thereof, styrene sulfonic acid and 2-acrylamido-2-methyl propyl sulfonic acid.

3. The method of claim 2 wherein the $\alpha,\beta$ ethylenically unsaturated compound is selected from the group consisting of acrylamide, methacrylamide, acrylic acid, methacrylic acid, maleic acid, maleic anhydride, itaconic acid, 2-hydroxylpropyl acrylate, methyl methacrylate and 2-ethylhexyl acrylate.

4. The method of claim 1 wherein F is selected from the group consisting of $NHR_3N^+(R_4, R_5, R_6)M^-$ and $OR_3N^+(R_4, R_5, R_6)M^-$, wherein $R_3$ is a $C_1$ to $C_4$ linear or branched alkylene group, $R_4$, $R_5$, and $R_6$ are selected from the group consisting of hydrogen, $C_1$ to $C_4$ linear or branched alkyl, $C_5$ to $C_8$ cycloalkyl, aromatic or alkylaromatic group, and $M^-$ is an anion selected from the group consisting of chloride, bromide, methyl sulfate and hydrogen sulfate.

5. The method of claim 4 wherein the cationic monomer is selected from the group consisting of 2-acryloyloxyethyltrimethylammonium chloride, 3-methacrylamidopropyltrimethyl ammonium chloride, 2-methacryloyloxyethyltrimethylammonium chloride and diallyldimethylammonium chloride.

6. The method of claim 1 wherein the graft copolymer has the structure:

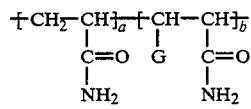

wherein the molar percentage a:b is from about 95:5 to 5:95, with the proviso that the sum of a and b equals 100%, and G has the structure:

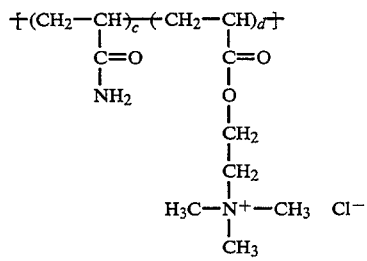

7. The method of claim 1 wherein the number average molecular weight of G is from about 1,000 to about 1,000,000.

8. The method of claim 7 wherein the number average molecular weight of G is from about 5,000 to about 500,000.

9. The method of claim 8 wherein the number average molecular weight of G is from about 10,000 to about 200,000.

10. The method of claim 1 wherein the graft copolymer has a number average molecular weight of from about 10,000 to 30,000,000.

11. The method of claim 10 wherein the graft copolymer has a number average molecular weight of from about 1,000,000 to 30,000,000.

12. The method of claim 1 wherein the amount of graft copolymer added is from about 2 to 25 ppm per total influent volume.

13. The method of claim 1 wherein the graft copolymer is added to the influent flow prior to the clarifier.

* * * * *